(12) United States Patent
Boxwala et al.

(10) Patent No.: US 11,707,872 B2
(45) Date of Patent: Jul. 25, 2023

(54) HOT RUNNER SYSTEM

(71) Applicant: MOLD-MASTERS (2007) LIMITED, Georgetown (CA)

(72) Inventors: Hakimuddin Boxwala, Brampton (CA); Yikun Wang, Mississauga (CA); Douglas Brien Ursu, Orangeville (CA)

(73) Assignee: MOLD-MASTERS (2007) LIMITED, Georgetown (CA)

( * ) Notice: Subject to any disclaimer, the term of this patent is extended or adjusted under 35 U.S.C. 154(b) by 0 days.

(21) Appl. No.: 17/682,044

(22) Filed: Feb. 28, 2022

(65) Prior Publication Data
US 2022/0281147 A1    Sep. 8, 2022

Related U.S. Application Data

(60) Provisional application No. 63/157,079, filed on Mar. 5, 2021.

(51) Int. Cl.
*B29C 45/28* (2006.01)
*B29C 45/27* (2006.01)
*B29C 45/17* (2006.01)

(52) U.S. Cl.
CPC ........ *B29C 45/281* (2013.01); *B29C 45/2725* (2013.01); *B29C 2045/1797* (2013.01); *B29C 2045/2762* (2013.01); *B29C 2045/2827* (2013.01)

(58) Field of Classification Search
CPC ........ B29C 45/2725; B29C 2045/1797; B29C 2045/2762; B29C 2045/2827; B29C 45/281
See application file for complete search history.

(56) References Cited

U.S. PATENT DOCUMENTS

| | | | | |
|---|---|---|---|---|
| 4,682,945 A * | 7/1987 | Schad | ................ | B29C 45/2725 425/572 |
| 4,740,151 A * | 4/1988 | Schmidt | ............. | B29C 45/2806 425/572 |
| 4,755,131 A * | 7/1988 | Schmidt | ................ | B29C 45/281 425/549 |
| 5,223,275 A * | 6/1993 | Gellert | ................ | B29C 45/1603 425/572 |
| 6,074,191 A * | 6/2000 | Gellert | ................ | B29C 45/1607 425/572 |
| 6,840,758 B2 * | 1/2005 | Babin | ................. | B29C 45/2806 264/328.9 |
| RE40,478 E * | 9/2008 | Olaru | ................. | B29C 45/2737 425/566 |
| 7,470,122 B2 * | 12/2008 | Colonico | ............ | B29C 45/2806 425/566 |
| 7,517,214 B2 * | 4/2009 | Olaru | ................. | B29C 45/2806 425/566 |

(Continued)

*Primary Examiner* — Emmanuel S Luk
(74) *Attorney, Agent, or Firm* — Dinsmore & Shohl LLP

(57) ABSTRACT

A hot runner system having a nozzle and a manifold seated against the nozzle. An actuator plate is spaced apart from the manifold by a support pad which surrounds a lower mouth of an actuator bore that extends through the actuator plate. A valve pin extends through the support pad and the manifold to a downstream end of the nozzle. A cylinder is received in the actuator bore from a rearward side of the actuator plate and a piston coupled to the valve pin is received in the cylinder from a forward end of the cylinder.

17 Claims, 12 Drawing Sheets

(56) References Cited

U.S. PATENT DOCUMENTS

| | | | | |
|---|---|---|---|---|
| 7,581,944 | B2* | 9/2009 | Fairy | B29C 45/2806 |
| | | | | 425/564 |
| 7,618,253 | B2* | 11/2009 | Ten | B29C 45/2725 |
| | | | | 425/572 |
| 2004/0051195 | A1* | 3/2004 | Okamura | B29C 45/30 |
| | | | | 264/40.5 |
| 2004/0109916 | A1* | 6/2004 | Babin | B29C 45/1603 |
| | | | | 425/572 |
| 2004/0115295 | A1* | 6/2004 | Schunck | B29C 45/281 |
| | | | | 425/549 |
| 2006/0082031 | A1* | 4/2006 | Dewar | B29C 45/2711 |
| | | | | 264/328.8 |
| 2007/0237854 | A1* | 10/2007 | Yu | B29C 45/27 |
| | | | | 425/572 |
| 2009/0104307 | A1* | 4/2009 | Ten | B29C 45/2725 |
| | | | | 425/572 |
| 2010/0159062 | A1* | 6/2010 | Klobucar | B29C 45/281 |
| | | | | 425/568 |
| 2010/0233311 | A1* | 9/2010 | Tapuchievici | B29C 45/27 |
| | | | | 425/563 |
| 2011/0241238 | A1* | 10/2011 | Trakas | B29C 45/176 |
| | | | | 251/63.5 |
| 2012/0225148 | A1* | 9/2012 | Tabassi | B29C 45/281 |
| | | | | 425/3 |
| 2012/0231111 | A1* | 9/2012 | Catoen | B29C 45/2806 |
| | | | | 425/562 |
| 2013/0147091 | A1* | 6/2013 | Babin | B29C 45/281 |
| | | | | 264/328.15 |
| 2013/0207289 | A1* | 8/2013 | Babin | B29C 45/76 |
| | | | | 264/40.1 |
| 2013/0230617 | A1* | 9/2013 | Klobucar | B29C 45/20 |
| | | | | 425/549 |
| 2020/0290252 | A1* | 9/2020 | Bosonetto | B29C 45/2725 |

* cited by examiner

HOT RUNNER SYSTEM

RELATED APPLICATIONS

This application claims the benefit of U.S. Provisional Application No. 63/157,079, filed Mar. 5, 2021, which is incorporated by referenced herein in its entirety.

TECHNICAL FIELD

The present application relates to a valve gating hot runner system, and in particular, to a plate-mounted valve pin actuator of a valve gating hot runner system.

BACKGROUND

Valve gating hot runner systems require maintenance to service actuators which translate valve pins between open and close positions. The actuators typically include a piston seal and often include additional seals to prevent pressurized fluid from leaking from the actuator. Such seals are often degraded by heat from the hot runner system. To maximize the production from a mold in which a valve gating hot runner system is installed, it is desirable to prolong a service interval for the actuators. Further, during periodic maintenance of the hot runner system, simple assembly and disassembly of the hot runner system to access the actuator seals is desirable since it decreases the time that the mold is out of production.

SUMMARY

An aspect of the present application provides a hot runner system comprising: a hot runner plate, a nozzle received in a well in the hot runner plate, the nozzle having a nozzle channel for delivering molding material to a respective mold cavity; a manifold seated against the nozzle, the manifold having a manifold channel in fluid communication with the nozzle channel; an actuator plate spaced apart from the manifold, the actuator plate having an actuator bore extending therethrough; a support pad separating the manifold and the actuator plate, the support pad having a forward bearing surface seated against the manifold and a rearward bearing surface against which the actuator plate is seated, the rearward bearing surface surrounding a lower mouth of the actuator bore; a valve pin extending through the support pad and the manifold to a downstream end of the nozzle; a cylinder received in the actuator bore from a rearward side of the actuator plate; and a piston coupled to the valve pin, the piston received in the cylinder from a forward end of the cylinder.

The piston can be sized to pass through the actuator bore without obstruction by the actuator plate.

The actuator bore can include a step against which a forward end of the cylinder is seated.

A rearward end of the cylinder can include a flange.

The hot runner system can include a sealing member surrounding the cylinder and compressed between the flange and a step in the actuator bore.

The flange can overhang the piston.

The flange can include at least one extraction bore.

The flange can extend outward from a wall of the cylinder and be seated against a step in the actuator bore.

The hot runner system can include a sealing member surrounding the cylinder and compressed between a circumferential wall of the cylinder and the actuator bore.

The flange can extend rearward from a wall of the cylinder at an obtuse angle to the wall of the cylinder and include an annular sealing surface compressed against a cover plate.

The forward end of the cylinder can be axially spaced apart from a forward side of the actuator plate.

The cylinder can be free from contact with the support pad.

The support pad can include a bushing portion and a spacer portion, the bushing including a valve pin bore through which the valve pin extends.

The bushing portion and the spacer portion can be discrete components.

The actuator plate can include a fluid duct intersecting the actuator bore on a forward side of the piston, the fluid duct including an outlet at least partially unobstructed by the cylinder sleeve.

The hot runner system can include a cover plate secured to the actuator plate and enclosing a rearward mouth of the actuator bore.

The cover plate can include a fluid duct in fluid communication with a piston chamber defined by the piston, the cylinder sleeve, and the cover plate.

The hot runner system can include a sealing member sandwiched between the cover plate and a rearward end of the cylinder, the sealing member surrounding a chamber inlet and an outlet of the fluid duct.

DETAILED DESCRIPTION

In the following description, "downstream" is used with reference to the general direction of molding material flow from an injection unit to a mold gate of a mold cavity of an injection molding apparatus and to the order of components, or features thereof, through which the molding material flows from an inlet of the injection molding apparatus to the mold gate. "Upstream" is used with reference to the opposite direction.

In the following description, "rearward" is used with reference to a direction towards a stationary platen of a molding machine and "forward" is used with reference to a direction away from the stationary platen of a molding machine.

In the following description, reference numbers followed by the letter "s" refer to components or features thereof which are shown schematically.

In the following description there is no intention to be bound by any expressed or implied theory.

Figure 1:
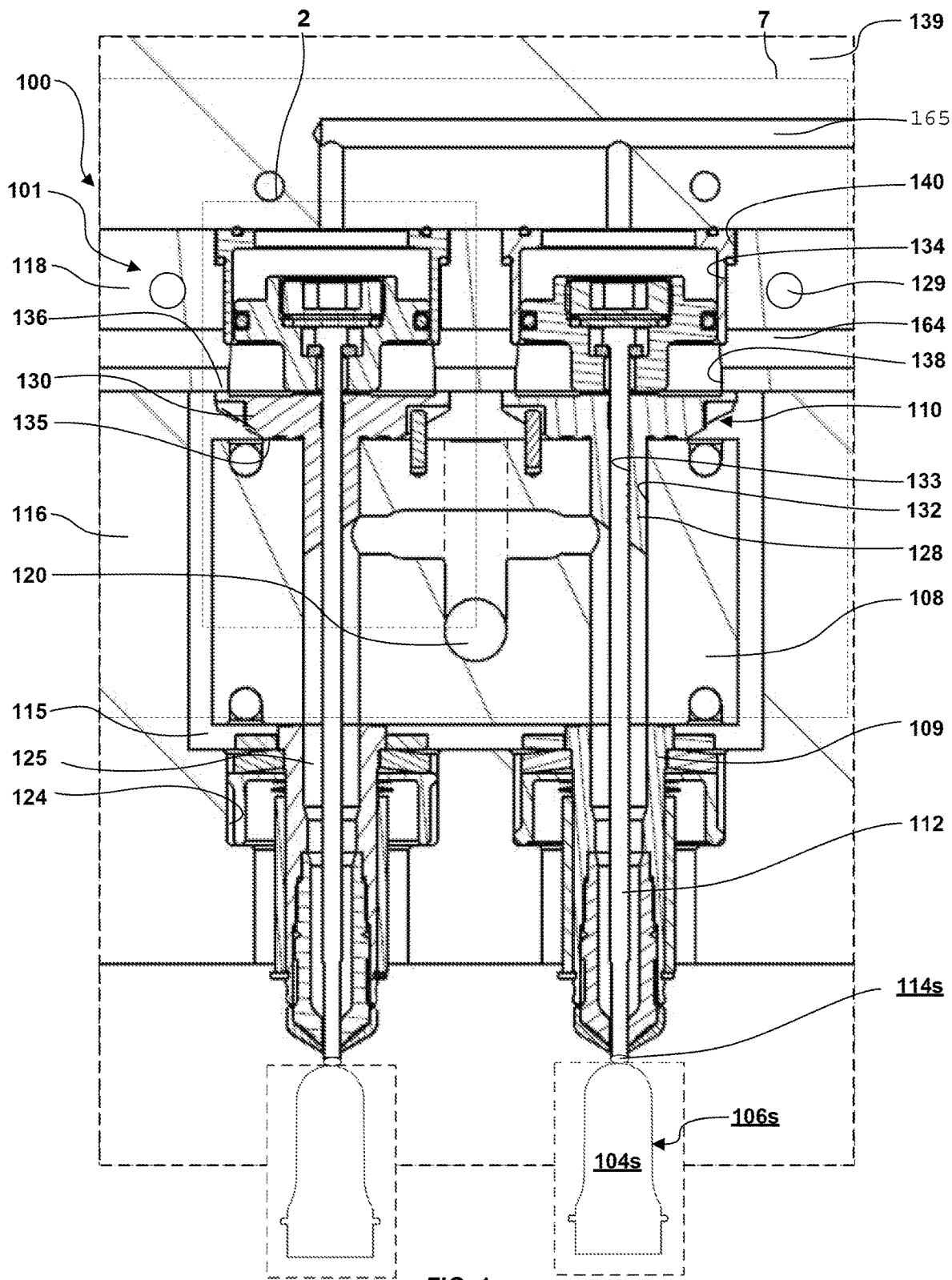
FIG. 1 is a sectional view of a portion of a hot runner system having a valve pin actuator in accordance with an embodiment of the present application.

FIG. 1 is a sectional view of a portion of a hot runner system 100 in accordance with an embodiment of the present application. Hot runner system 100 is for delivering molding material to a mold cavity 104s which defines the shape of a molded article 106s that is formed with hot runner system 100. Hot runner system 100 includes a manifold 108, a nozzle 109, a support pad 110, a valve pin 112, and actuators 101. (Actuator 101 is a valve pin actuator.) In operation, actuator 101 translates valve pin 112 between a closed position in which valve pin 112 blocks a mold gate 114s leading to mold cavity 104s to prevent molding material from entering mold cavity 104s, and an open position in which valve pin 112 is separated from mold gate 114s to permit molding material to be injected into mold cavity 104s. In FIG. 1, valve pin 112 is in the closed position.

Manifold 108 and nozzle 109 are received in an enclosure 115 formed by a hot runner plate 116 and an actuator plate 118, which is secured to hot runner plate 116. Manifold 108 is seated against nozzle 109 and includes a manifold channel 120 extending therethrough (partially shown in phantom). Nozzle 109 is seated in a well 124 in hot runner plate 116 and includes a nozzle channel 125 which is in fluid communication with manifold channel 120. In operation, molding material flows through manifold channel 120 and nozzle channel 125, and into to mold cavity 104s via mold gate 114s.

Continuing with FIG. 1, support pad 110 includes a bushing portion 128 and a spacer portion 130. Bushing portion 128 is received in a valve pin passageway 132 that extends through manifold 108. Bushing portion 128 includes a valve pin bore 133 through which valve pin 112 extends. At least a portion of valve pin bore 133 is closely sized to valve pin 112 to reduce or prevent migration of molding material and/or molding material by-products through valve pin bore 133 to actuator 101.

Actuator plate 118 includes an actuator bore 134 extending therethrough in which actuator 101 is received. In this configuration, actuator 101 can be described as plate mounted. Actuator plate 118 includes a cooling channel 129 through which a cooling fluid is circulated to maintain actuator plate 118 and actuator 101 at a suitable operational temperature. Spacer portion 130 covers a portion of manifold 108 and blocks manifold 108 from pressurized fluid used to move valve pin 112 to the open position. Actuator plate 118 is spaced apart from manifold 108 by spacer portion 130. Spacer portion 130 includes a forward bearing surface 135 and a rearward bearing surface 136. Forward bearing surface 135 is seated against manifold 108 and surrounds valve pin passageway 132. Actuator plate 118 is seated against rearward bearing surface 136 which surrounds a forward mouth 138 of actuator bore 134 whereby a forward end of actuator bore 134 is enclosed by support pad 110. A rearward end of actuator bore 134 is enclosed by a cover plate 139 which is secured to actuator plate 118 and surrounds a rearward mouth 140 of actuator bore 134. In the illustrated embodiment of FIGS. 1 and 2, support pad 110 is a unitary component having bushing portion 128 and spacer portions 130.

Figure 2:
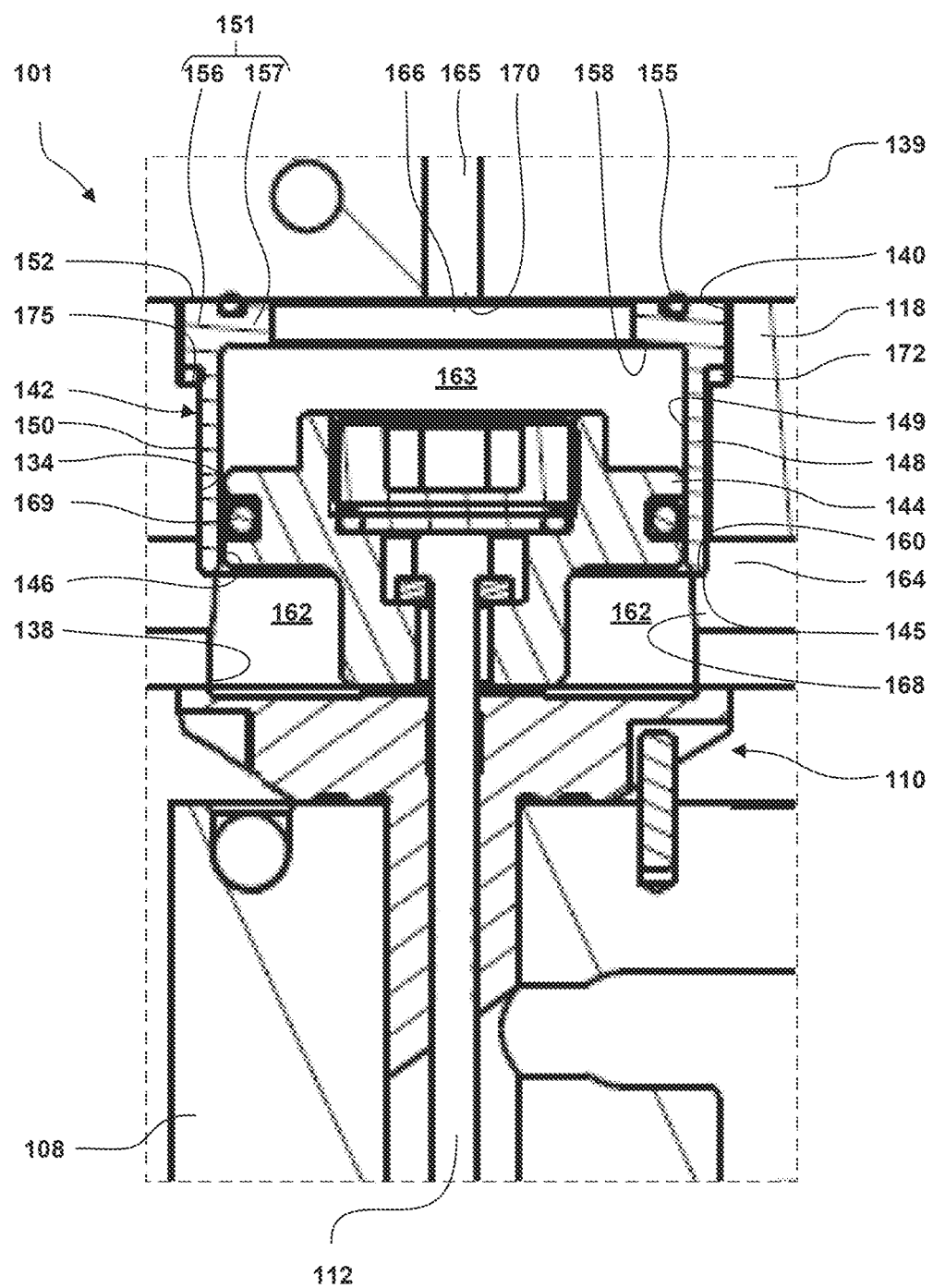
FIG. 2 is an enlarged view of a portion 2 of FIG. 1.

Referring to FIG. 2, which is an enlarged view of a portion 2 of FIG. 1, actuator 101 includes a cylinder 142 and a piston 144. Valve pin 112 is coupled to piston 144 and extends through support pad 110 and manifold 108. Actuator 101 includes a forward chamber 162 defined by piston 144, cylinder 144, actuator bore 134, and support pad 110, and a rearward chamber 163 defined by piston 144 cylinder 142, and cover plate 139. Piston 144 is moved to the open position, by introducing pressurized fluid to forward chamber 162 via an opening fluid duct 164 (see also FIG. 1) that extends laterally within actuator plate 118 and intersects actuator bore 134 on a downstream side of piston 144. Conversely, piston 144 is moved to the closed position by introducing pressurized fluid to rearward piston chamber 163 via a closing fluid duct 165 that extends within cover plate 139 and is in fluid communication with rearward chamber 163 via a rearward chamber inlet 166. In the illustrated embodiment of FIGS. 1 and 2, rearward chamber inlet 166 is located at rearward end 152 of cylinder 142 and is defined by an inner circumferential surface of inner flange 157.

Continuing with FIG. 2, cylinder 142 is installed in actuator bore 134 from a rearward side of actuator plate 118, i.e., through rearward mouth 140 of actuator bore 134, and piston 144 is installed in cylinder 142 from a forward end 145 of cylinder 142, i.e., through a forward mouth 146 of cylinder 142. Piston 144 is sized to be able to pass through actuator bore 134 without being obstructed by actuator plate 118. In other words, between rearward and forward mouths 140, 138, a diameter of actuator bore 134 is larger than a diameter of piston 144. In this configuration, piston 144 can pass through actuator bore 134 from either side of actuator plate 118 which facilitates assembly and disassembly of hot runner system in a variety of ways to accommodate different types of maintenance of actuator 101.

Continuing with FIG. 2, cylinder 142 is generally sleeve shaped and includes a cylinder wall 148 having an inner circumferential surface 149 with which piston 144 is slidably mated, and an outer circumferential surface 150 contacts actuator bore 134 to facilitate cooling actuator 145. Cylinder 142 further includes a flange 151 extending from cylinder wall 148. Flange 151 increases the surface area of a rearward end 152 of cylinder 142 to accommodate a sealing member 155 which is compressed between cylinder 142 and cover plate 139. Flange 151 includes an outer flange 156 and an inner flange 157. Outer flange 156 extends outward from cylinder wall 148 and overhangs actuator plate 118. Inner flange 157 extends inward from cylinder wall 148 and overhangs piston 144 to provide a lip 158 by which cylinder 142 can be engaged, for example by hand or with a suitable tool, to help extract cylinder 142 from actuator bore 134. In the illustrated embodiment of FIGS. 1 and 2 a forward end 145 of cylinder 142 is seated against a step 160 (step 160 is rearward facing) in actuator bore 134. Step 160 is rearwardly spaced apart from a forward side of actuator plate 118 to physically separate cylinder 142 from support pad 110 which helps to limit heat transfer from manifold 108 to cylinder 142.

In the illustrated embodiment of FIGS. 1 and 2, step 160 intersects opening fluid duct 164. In this configuration an outlet 168 of opening fluid duct 164 is partially obstructed by cylinder 142 and forward end 145 of cylinder 142 is exposed to pressurized fluid as piston 144 is moved to the open position, which can help reduce the temperature of cylinder 142.

Actuator 101 typically includes a piston seal 169, for example, an O-ring which is slidably mated with inner circumferential surface 149. Actuator can also be provided with one or more additional sealing members which limit or prevent pressurized fluid leaking from forward and/or rearward chambers 162, 163.

In the illustrated embodiment of FIGS. 1 and 2, seal 155 is a rearward chamber seal which surrounds chamber inlet 166 an outlet 170 of closing fluid duct 165. Actuator 101 further includes a forward chamber seal 172 which surrounds cylinder wall 148 and is compressed by outer flange 156 and another step 175 in actuator bore 134.

Figure 3:
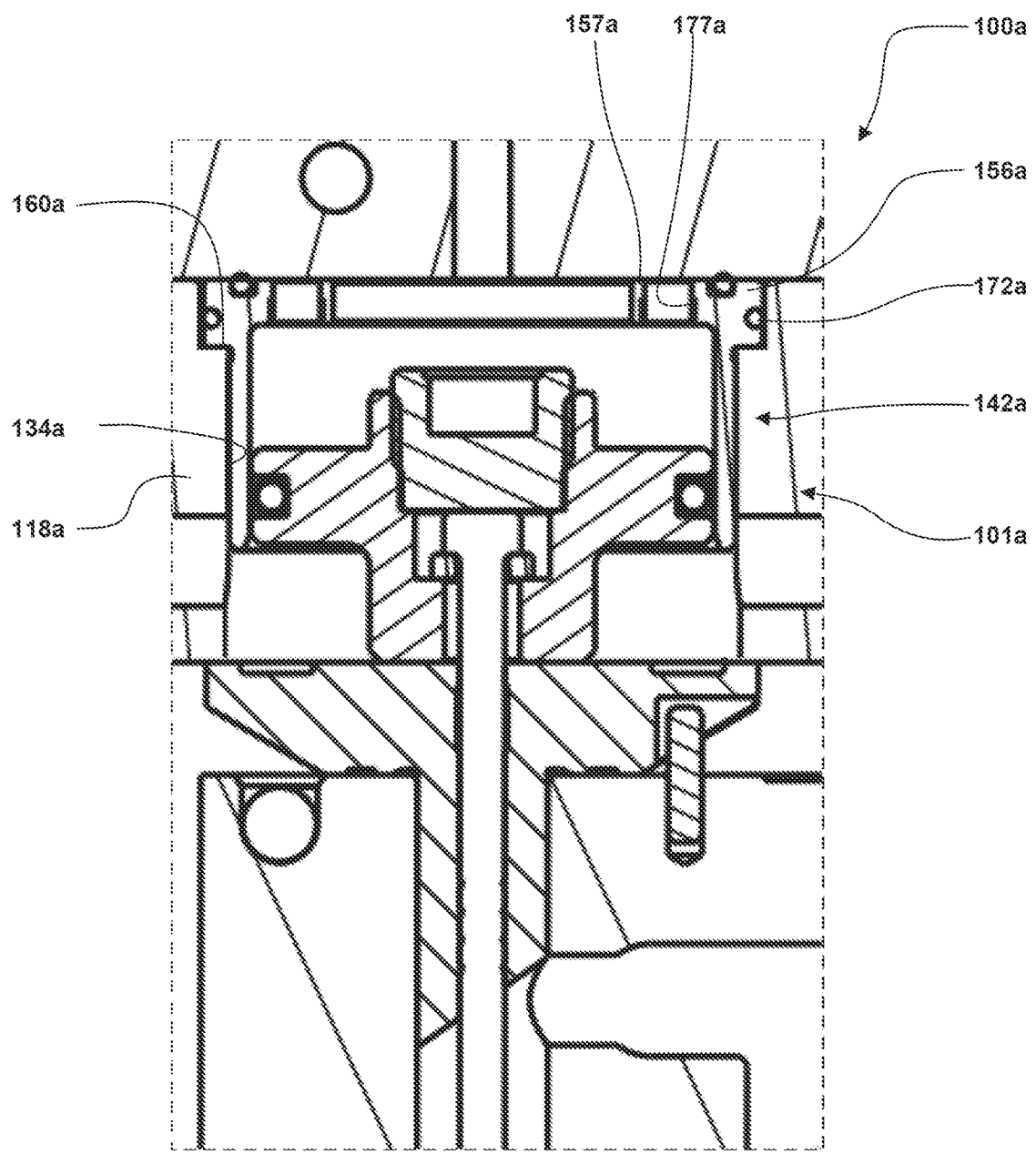
FIG. 3 is a portion of a hot runner system, similar to portion 2 of FIG. 1, showing a valve pin actuator having a cylinder sleeve in accordance with another embodiment of the present application.

FIG. 3 is a portion of a hot runner system 100a, similar to portion 2 of FIG. 1, showing an actuator 101a in accordance with another embodiment of the present application. Features and aspects of the current embodiment can be used with the other embodiments disclosed herein. In the illustrated embodiment of FIG. 3, a flange 156a of cylinder 142 is seated against a step 160a (step 160a is rearward facing) in an actuator bore 134a that extends through actuator plate 118a. Continuing with the illustrated embodiment of FIG. 3, inner flange 157a includes an extraction bore 177a formed therein, into which a tool (not shown) can be inserted to assist with removing cylinder 142a from actuator bore 134a. Extraction bore 177a can be threaded to engage with a correspondingly threaded tool. In the illustrated embodiment of FIG. 3, extraction bore 177a extends through a thickness of inner flange portion 157a; however, extraction bore 177a can also be formed in outer flange portion 156a. Also, in the illustrated embodiment of FIG.3, actuator 101a includes a forward chamber seal 172a surrounding outer flange 156a and compressed against a portion of actuator bore 134a that extends rearward from step 160a.

Figure 4:
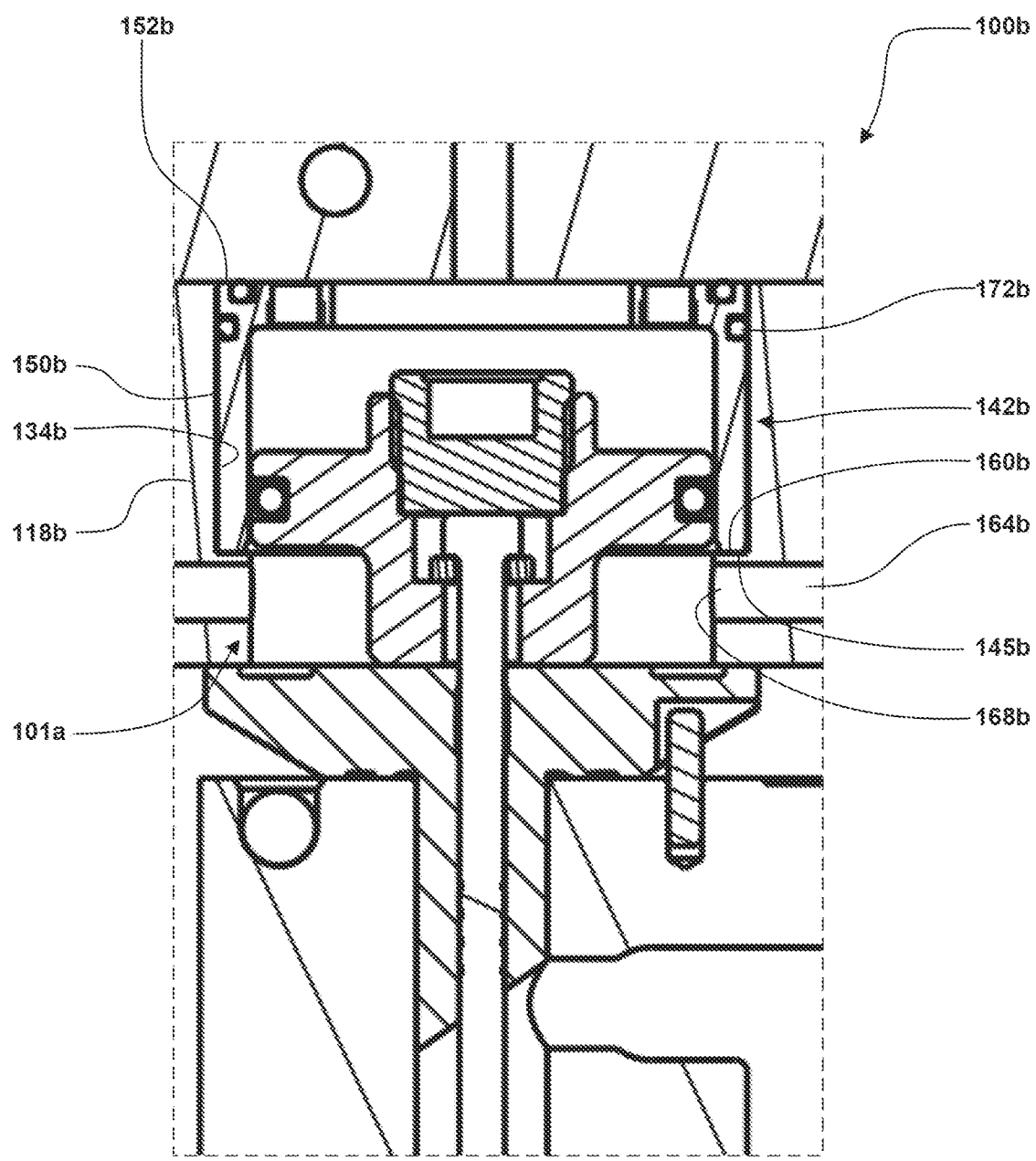
FIG. 4 is a portion of a hot runner system, similar to portion 2 of FIG. 1, showing a valve pin actuator having a cylinder sleeve in accordance with another embodiment of the present application.

FIG. 4 is a portion of a hot runner system 100b, similar to portion 2 of FIG. 1, showing an actuator 101b in accordance with another embodiment of the present application. Features and aspects of the current embodiment can be used with the other embodiments disclosed herein. In the illustrated embodiment of FIG. 4, an actuator bore 134b extending through actuator plate 118b includes a step 160b (step 160b (is rearward facing)) against which a forward end 145b of cylinder 142b is seated. Step 160b is located rearward from an outlet 168b of opening fluid duct 164b. In this configuration, outlet 168b is unobstructed by cylinder 142b. In the illustrated embodiment of FIG. 4, an outer circumferential surface 150b of cylinder 142b extends to a rearward end 152b of cylinder 142b. In other words, cylinder 142b is without an outer flange portion. In the illustrated embodiment of FIG. 4, a forward chamber seal 172b surrounds outer circumferential surface 150b and is compressed against a portion of actuator bore 134b that is rearward from step 160b.

Figure 5:
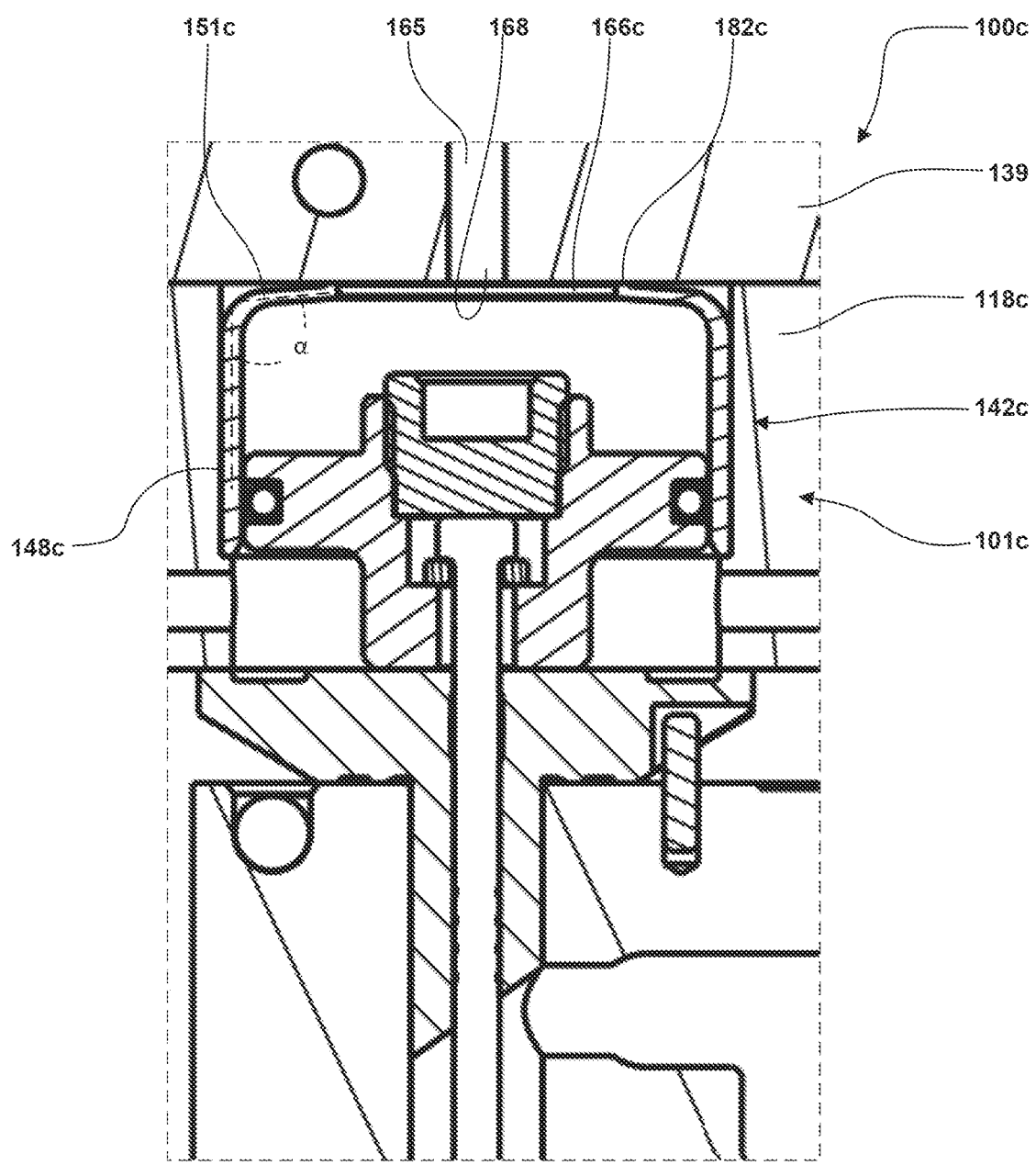
FIG. 5 is a portion of a hot runner system, similar to portion 2 of FIG. 1, showing a valve pin actuator having a cylinder sleeve in accordance with another embodiment of the present application.

FIG. 5 is a portion of a hot runner system 100c, similar to portion 2 of FIG. 1, showing an actuator 101c in accordance with another embodiment of the present application. Features and aspects of the current embodiment can be used with the other embodiments disclosed herein. In the illustrated embodiment of FIG. 5 actuator 101c includes a cylinder 142c having a flange 151c that extends rearward from a cylinder wall 148c at an obtuse angle α. Instead of including a separate sealing member, flange 151c includes an annular sealing surface 182c which surrounds a closing chamber inlet 166c of cylinder 142c. When cover plate 139 is secured to actuator plate 118c, flange 151c is compressed which creates a rearward chamber seal which surrounds outlet 168 of closing fluid duct 165 and closing chamber inlet 166c. Although flange 151c is shown extending inward from cylinder wall 148c at an obtuse angle, flange 151c can instead extend outward from cylinder wall 148c at an obtuse angle (not shown).

Figure 6:
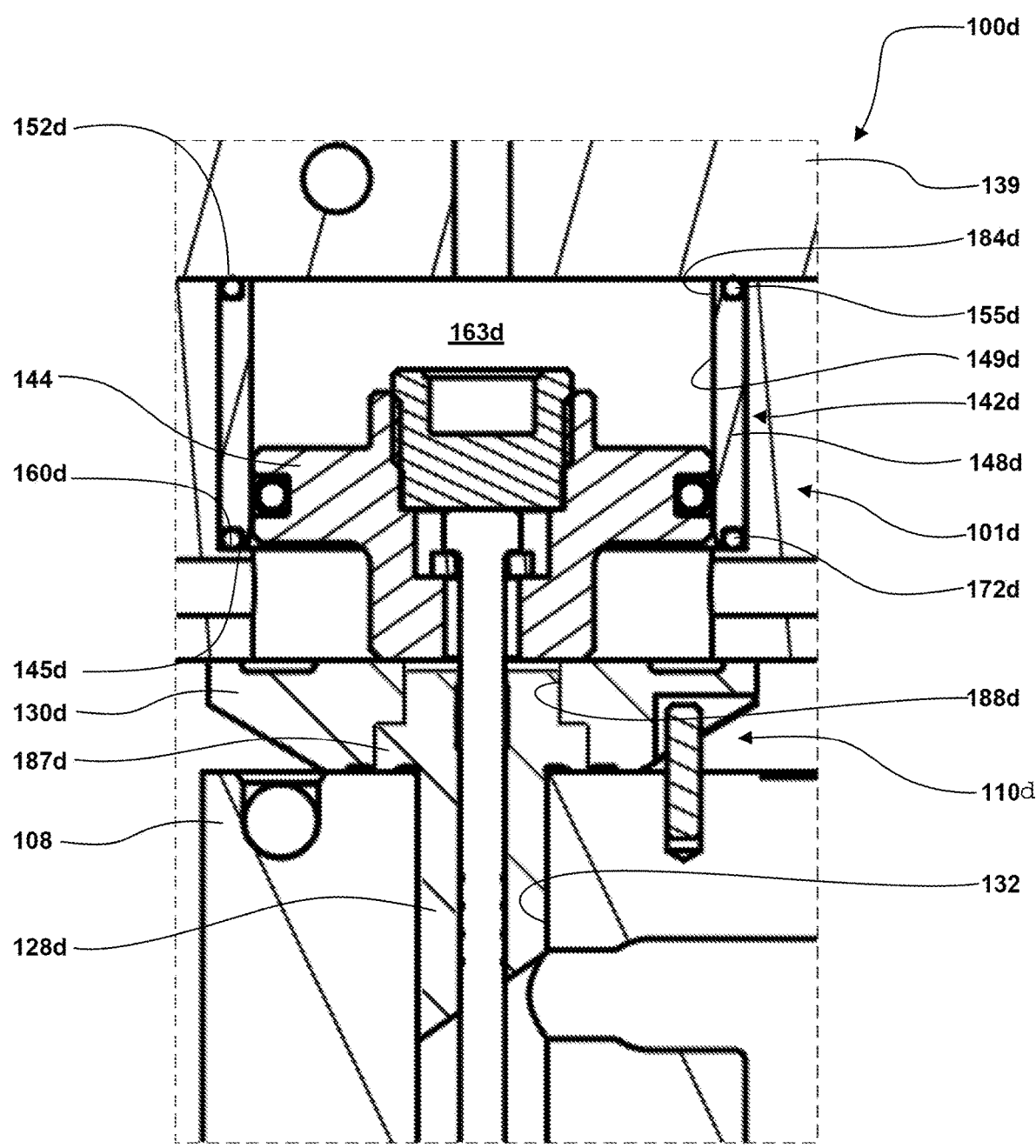
FIG. 6 is a portion of a hot runner system, similar to portion 2 of FIG. 1, showing a valve pin actuator having a cylinder sleeve in accordance with another embodiment of the present application.

FIG. 6 is a portion of a hot runner system 100d, similar to portion 2 of FIG. 1, showing an actuator 101d in accordance with another embodiment of the present application. Features and aspects of the current embodiment can be used with the other embodiments disclosed herein. In the illustrated embodiment of FIG. 6 hot runner system 100d includes an actuator 101d having a cylinder 142d with an inner circumferential surface 149d that extends axially through cylinder 142d. In other words, cylinder 142d is without an inner flange. In this configuration, inner circumferential surface 149d can be described as forming a rearward mouth 184d through which piston 144 can be installed in cylinder 142d. in this configuration, piston 144 can be installed in cylinder 142d from either the forward end 145d or the rearward end 152d of cylinder 142d. In operation pressurized fluid is introduced to a rearward chamber 163d of actuator 101d through rearward mouth 184d. In the illustrated embodiment of FIG. 6 actuator 101d includes a rearward chamber seal 155d which is compressed between cylinder wall 148d and cover plate 139 and includes a forward chamber seal 172d which is compressed between cylinder wall 148d and a rearward facing step 160d in actuator bore 134d against which cylinder 142d is seated.

Continuing with the illustrated embodiment of FIG. 6, a support pad 110d includes a bushing portion 128d and spacer portion 130d which are discrete components. Bushing portion 128d is received in valve pin passage 132 and includes a flange 187d seated against manifold 108. Bushing portion 128d extends rearward from flange 187d and is received in a bore 188d in spacer 130d whereby spacer 130d is located on manifold 108.

FIGS. 7-12 are views of a portion 7 of FIG. 1 depicting disassembly of hot runner system 100 for servicing.

Figure 7:
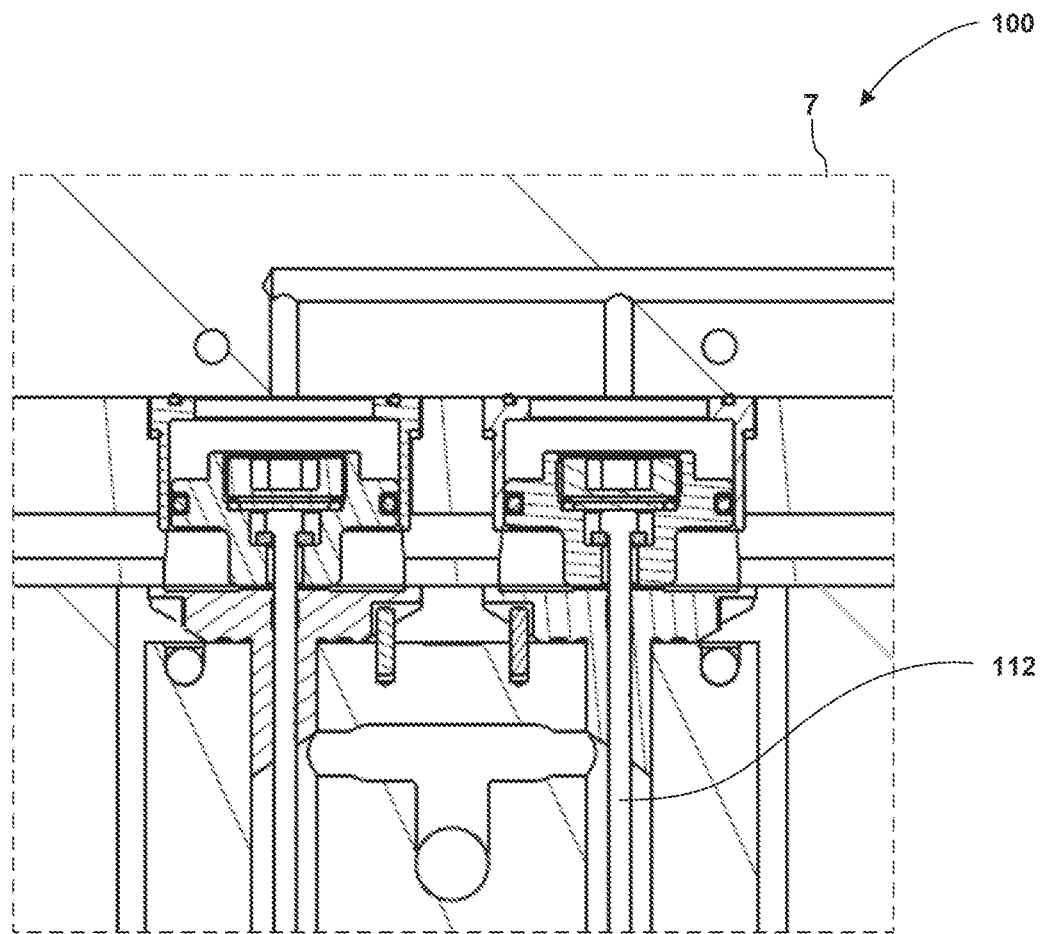
FIG. 7 is a portion 7 of FIG. 1 in which the hot runner system is assembled and a valve pin of the hot runner system is in a closed position.

Referring to FIG. 7, hot runner system 100 is assembled and valve pin 112 is in the closed position.

Figure 8:
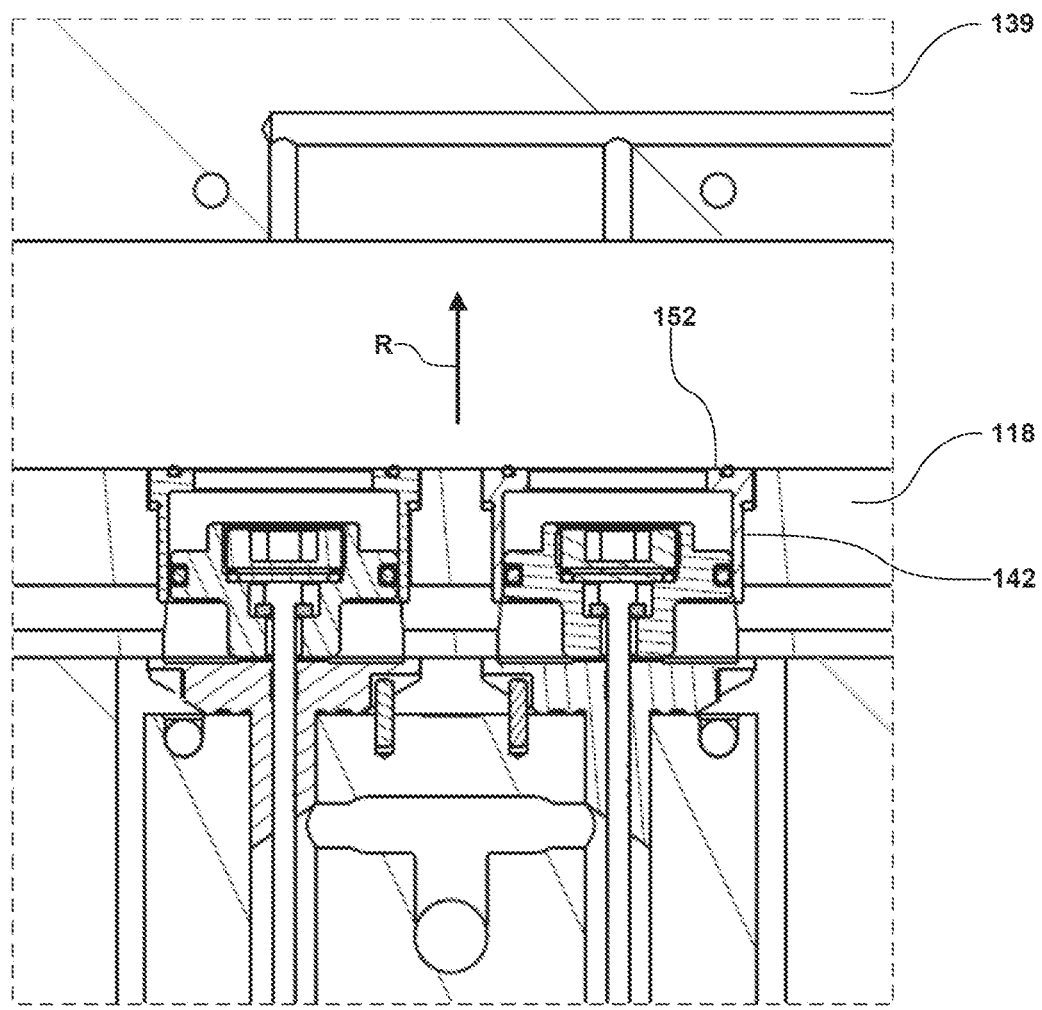
FIG. 8 is the portion 7 of FIG. 1 showing the hot runner system with a cover plate separated from an actuator plate.

Referring to FIG. 8, cover plate 139 is rearwardly separated from actuator plate 118, as shown by arrow R, whereby rearward end 152 of cylinder 142 is exposed.

Figure 9:
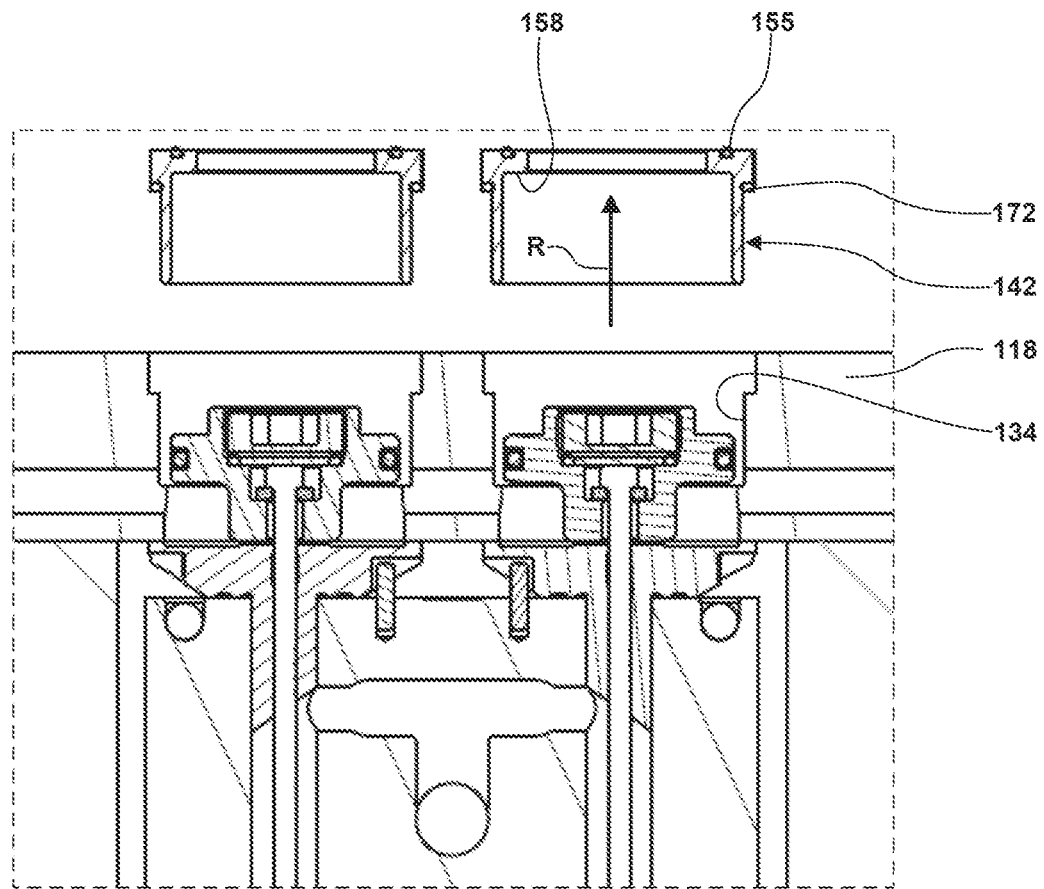
FIG. 9 is the portion 7 of FIG. 1 showing a cylinder of an actuator removed from the actuator plate.

Referring to FIG. 9, cylinder 142 is removed actuator bore 134 by engaging lip 158 with a suitable extraction tool (not shown) and pulling cylinder 142 in a rearward direction as shown by arrow R.

Figure 10:
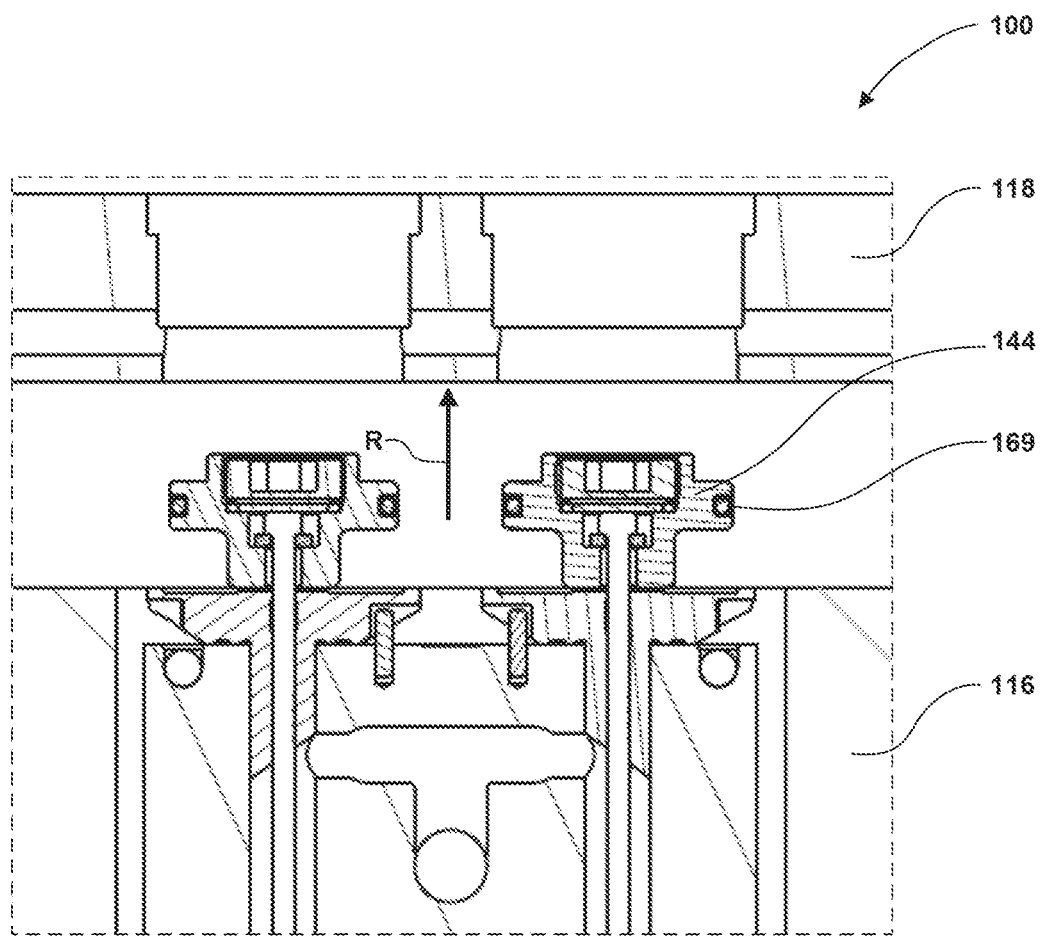
FIG. 10 is the portion 7 of FIG. 1 showing the actuator plate separated from a hot runner plate of the hot runner system.

Referring to FIG. 10, actuator plate 118 is separated from hot runner plate 116, whereby piston 144 is exposed. Piston seal 169 is freely accessible, as are forward and rearward chamber seals 172, 155 (see FIG. 9) associated with cylinder 142 (see FIG. 9), which has been previously removed from actuator plate 118.

Figure 11:
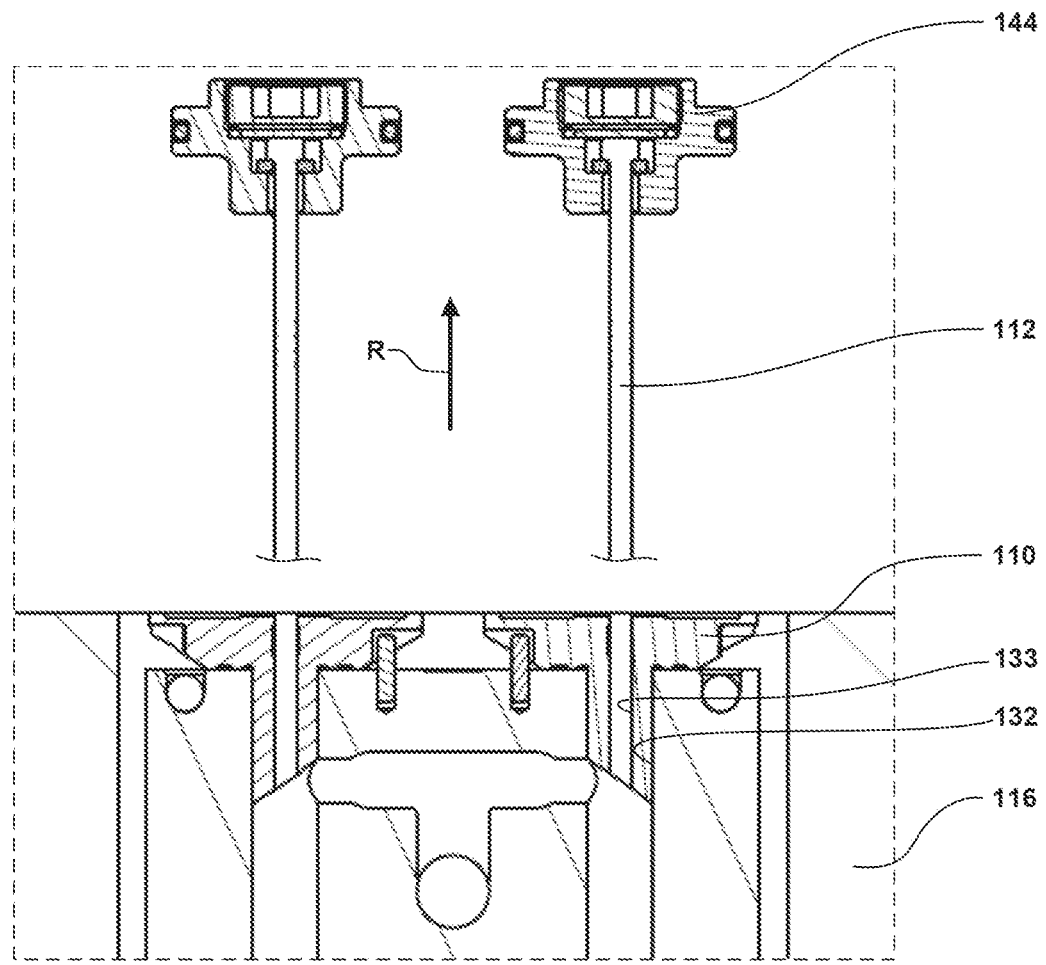
FIG. 11 is the portion 7 of FIG. 1 showing the valve pin withdrawn from a support pad of the hot runner system.

Referring to FIG. 11, with actuator plate 118 (not shown in FIG. 11) removed from hot runner plate 116, if piston 144, valve pin 112, and/or support pad 110 require service, valve pin 112 can be withdrawn from valve pin bore 133 and support pad 110 can be withdrawn from valve pin passageway 132 without being incumbered by actuator plate 118.

Figure 12:
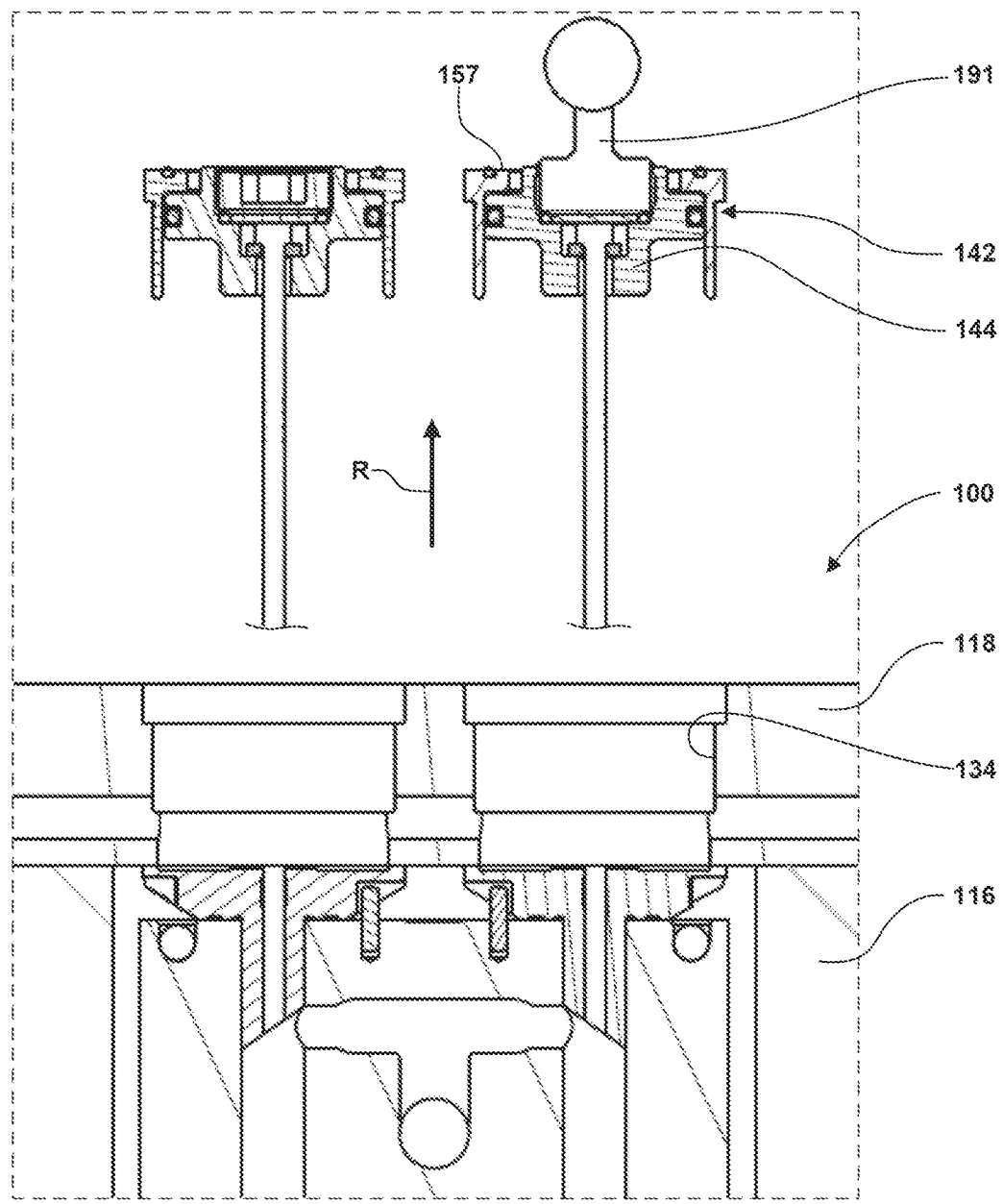
FIG. 12 is the portion 7 of FIG. 1 showing a cylinder and piston of the hot runner system removed from the actuator plate without separating the actuator plate from the hot runner plate.

Referring to FIG. 12, hot runner system 100 also permits removing cylinder 142 and pistons 144 from actuator bore 134 without separating actuator plate 118 from hot runner plate 116. After separating cover plate 139 (not shown in FIG. 12) from actuator plate 118, a tool 191 is secured to piston 144, by, for example, a threaded connection therebetween. With tool 191 secured to piston 144, rearward displacement of tool 191 as shown by arrow R, pulls piston 144 rearwardly therewith. Upon piston 144 contacting inner flange 157, as shown in FIG. 12, further rearward displacement of tool 191 pulls both piston 144 and cylinder 142 rearwardly to remove both cylinder 142 and piston 144 from actuator bore 134.

While various embodiments have been described above, they are presented only as illustrations and examples, and not by way of limitation. Thus, the present application should not be limited by any of the above-described embodiments but should be defined only in accordance with the appended claims and their equivalents.

What is claimed is:

1. A hot runner system comprising:
a hot runner plate;
a nozzle received in a well in the hot runner plate, the nozzle having a nozzle channel for delivering molding material to a respective mold cavity;
a manifold seated against the nozzle, the manifold having a manifold channel in fluid communication with the nozzle channel;
an actuator plate upstream of the hot runner plate and spaced apart from the manifold, the actuator plate having an actuator bore extending therethrough;
a support pad separating the manifold and the actuator plate, the support pad having a forward bearing surface seated against the manifold and a rearward bearing surface against which the actuator plate is seated, the rearward bearing surface surrounding a lower mouth of the actuator bore;
a valve pin extending through the support pad and the manifold to a downstream end of the nozzle;
a cylinder received in the actuator bore from a rearward side of the actuator plate; and
a piston coupled to the valve pin, the piston received in the cylinder from a forward end of the cylinder,
wherein the actuator plate includes a fluid duct intersecting the actuator bore on a forward side of the piston, the fluid duct including an outlet at least partially obstructed by the cylinder.

2. The hot runner system of claim 1, wherein the piston is sized to pass through the actuator bore without obstruction by the actuator plate.

3. The hot runner system of claim 1, wherein the actuator bore includes a step against which a forward end of the cylinder is seated.

4. The hot runner system of claim 1, further comprising a sealing member surrounding the cylinder and compressed between a circumferential wall of the cylinder and the actuator bore.

5. The hot runner system of claim 1, wherein the forward end of the cylinder is axially spaced apart from a forward side of the actuator plate.

6. The hot runner system of claim 1, wherein the cylinder is free from contact with the support pad.

7. The hot runner system of claim 1, wherein the support pad includes a bushing portion and a spacer portion, the bushing portion including a valve pin bore through which the valve pin extends.

8. The hot runner system of claim 7, wherein the bushing portion and the spacer portion are discrete components.

9. The hot runner system of claim 1, wherein a rearward end of the cylinder includes a flange.

10. The hot runner system of claim 9, further comprising a sealing member surrounding the cylinder and compressed between the flange and a step in the actuator bore.

11. The hot runner system of claim 9, wherein the flange overhangs the piston.

12. The hot runner system of claim 9, wherein the flange includes at least one extraction bore.

13. The hot runner system of claim 9, wherein the flange extends outward from a wall of the cylinder and is seated against a step in the actuator bore.

14. The hot runner system of claim 9, wherein the flange extends rearward from a wall of the cylinder at an obtuse angle to the wall of the cylinder, the flange including an annular sealing surface compressed against a cover plate.

15. The hot runner system of runner system of claim 1 further comprising: a cover plate secured to the actuator plate and enclosing a rearward mouth of the actuator bore.

16. The hot runner system of runner system of claim 15, wherein the cover plate includes the fluid duct in fluid communication with a piston chamber defined by the piston, the cylinder, and the cover plate.

17. The hot runner system of claim 16 further comprising: a sealing member sandwiched between the cover plate and a rearward end of the cylinder, the sealing member surrounding a chamber inlet and the outlet of the fluid duct.

* * * * *